L. J. HERBOLDSMAN & G. L. EPPIHIMER.
SIFTER.
APPLICATION FILED APR. 8, 1911.
1,018,904.
Patented Feb. 27, 1912.
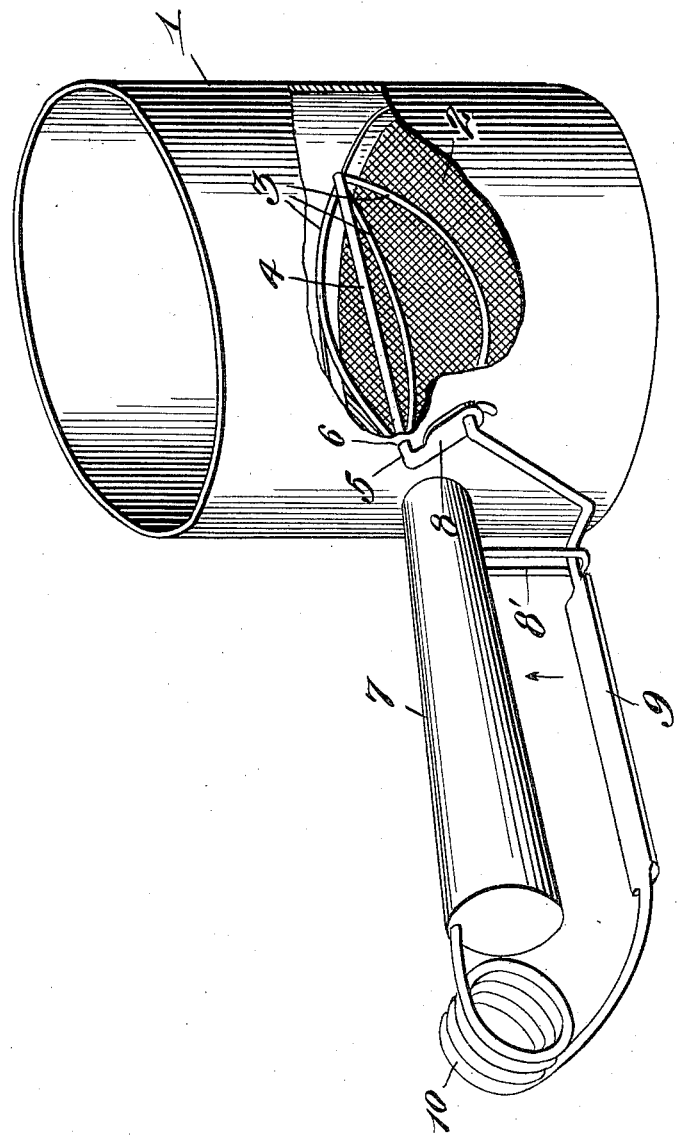
Witnesses
Chas. L. Griestauer.
L. G. Ellis.
Inventors
G. L. Eppihimer and
L. J. Herboldsman,
By Watson E. Coleman.
Attorney

UNITED STATES PATENT OFFICE.

LOUIS J. HERBOLDSMAN AND GEORGE L. EPPIHIMER, OF MALDEN, MISSOURI, ASSIGNORS TO M. A. STOKES AND COMPANY, OF MALDEN, MISSOURI.

SIFTER.

1,018,904.  Specification of Letters Patent.  Patented Feb. 27, 1912.

Application filed April 8, 1911. Serial No. 619,790.

*To all whom it may concern:*

Be it known that we, LOUIS J. HERBOLDSMAN and GEORGE L. EPPIHIMER, citizens of the United States, residing at Malden, in the county of Dunklin and State of Missouri, have invented certain new and useful Improvements in Sifters, of which the following is a specification, reference being had to the accompanying drawings.

This invention relates to sifters and more particularly to household sifters for flour and the like.

The object of the invention is to provide a sifter for flour and the like which requires the use of only one hand for the combined action of actuating the agitator and holding the sifter.

A further object of the invention is to have the parts for actuating the agitator entirely outside of the sifter and applicable to the common type of flour sifter now in use.

Other objects will become apparent as the invention is more fully set forth.

In the accompanying drawings which illustrate one form of my invention the figure represents a perspective view with parts broken away of a sifter embodying our invention.

Similar characters of reference refer to similar parts throughout the drawings.

In the appended drawings which illustrate by way of example an embodiment of our invention 1 indicates a sifter shell preferably cylindrical in shape and having a hemispherical screen bottom 2 for sifting the flour, and supplied with an agitator preferably of wire and journaled in the sides of the shell 1. The agitator consists in general of an axle piece 4 having circular arms 3 secured thereto and oscillated therewith and which in their motion move over and very close to the screen bottom 2.

Formed on an end portion 5 extending through the shell 1 at 6 near to the handle 7 for holding the sifter, is a loop 8 disposed at an angle to the axle 4. In the loop 8 loosely extends the end of an arm 9 which is bent and offset suitably to enter and operate it. The handle 7 has a wire guide 8' attached to it for guiding the arm 9 in a direction to assist the proper action of the agitator and to act as a stop against the action of a spring 10 tending to push the arm 9 away from the handle 7. The spring 10 is preferably disposed at and secured to the end of the handle 7 and the arm 9 the latter being placed underneath to be easily actuated by the fingers of the hand that holds the handle.

In operation the arm 9 is drawn toward the handle 7 in the direction of the arrow against the action of the spring 10, and permits the end 5 of the arm to rotate the loop 8 with its arm in the direction of the arrow which in turn gives the agitator a rotary motion in one way; by loosening the hold on the arm 9 the spring 10 acts thereon and causes the arm 9 and the agitator arms 3 to return to their first positions as can be clearly understood from the drawings.

The advantages of this device are many particularly as it permits the operation of sifting flour and the like to be more easily and conveniently done than is customary, but one particular feature is that the main actuating mechanism is outside of the shell of the sifter, thereby being easily accessible for inspection and repair, and out of the way of flour.

Obviously while we have described only one form of the invention we do not limit the same in any way otherwise than necessitated by the prior art, as many modifications of construction can be made without departing from the principles of this invention.

Having thus described the invention what is claimed is:

In a flour sifter having a cylindrical handle, of a wire having an end portion fastened to the outer end of the handle and bent into a coil spring form, said spring being adjacent to said handle and having its free end brought down under the same and secured to one end of a flattened member, disposed under said handle, and a wire member attached to the other end of the last mentioned member and connected to the beater so as to actuate the same, a guiding means secured to said handle adapted for guiding said wire member, substantially as described.

In testimony whereof we hereunto affix our signatures in the presence of two witnesses.

LOUIS J. HERBOLDSMAN.
GEORGE L. EPPIHIMER.

Witnesses:
M. A. STOKES,
R. W. STOKES.

Copies of this patent may be obtained for five cents each, by addressing the "Commissioner of Patents, Washington, D. C."